(12) United States Patent
Noguchi et al.

(10) Patent No.: US 7,325,826 B2
(45) Date of Patent: Feb. 5, 2008

(54) CURTAIN AIRBAG DEVICE

(75) Inventors: Atsushi Noguchi, Moriyama (JP); Tetsu Mitsuo, Nissin (JP)

(73) Assignee: Takata Corporation, Tokyo (JP)

( * ) Notice: Subject to any disclaimer, the term of this patent is extended or adjusted under 35 U.S.C. 154(b) by 324 days.

(21) Appl. No.: 11/017,804

(22) Filed: Dec. 22, 2004

(65) Prior Publication Data

US 2005/0140125 A1    Jun. 30, 2005

(30) Foreign Application Priority Data

Dec. 24, 2003 (JP) .............................. 2003-427238

(51) Int. Cl.
*B60R 21/16* (2006.01)
(52) U.S. Cl. ................. 280/730.2; 280/743.1; 280/749
(58) Field of Classification Search ............ 280/730.2, 280/743.1, 749
See application file for complete search history.

(56) References Cited

U.S. PATENT DOCUMENTS

| 6,129,377 | A  | * | 10/2000 | Okumura et al. ........ 280/730.2 |
| 6,237,938 | B1 |   | 5/2001  | Boxey |
| 6,361,068 | B1 | * | 3/2002  | Stein et al. ............... 280/730.2 |
| 6,565,118 | B2 | * | 5/2003  | Bakhsh et al. ........... 280/730.2 |
| 6,685,219 | B1 | * | 2/2004  | Yamaji et al. ............ 280/730.2 |
| 7,077,424 | B2 | * | 7/2006  | Inoue ...................... 280/730.2 |

FOREIGN PATENT DOCUMENTS

JP    2001-270413    10/2001

* cited by examiner

*Primary Examiner*—Eric Culbreth
(74) *Attorney, Agent, or Firm*—Foley and Lardner LLP

(57) ABSTRACT

A curtain airbag device and a guide unit are provided such that a lower rear portion of a curtain airbag can be deployed smoothly. When an inflator is activated, a curtain airbag is deployed in the downward direction. During the deployment, the rear portion of the curtain airbag is guided by a guide rod via a link strap. To fold the curtain airbag, the lower rear portion of the curtain airbag is folded back at an angle along slanted folding lines. Subsequently, the curtain airbag is rolled or folded along lines extending in a horizontal direction of the curtain airbag. This airbag structure allows the lower rear portion of the curtain airbag to be deployed downward and towards the back of the vehicle.

20 Claims, 2 Drawing Sheets

CURTAIN AIRBAG DEVICE

BACKGROUND

The present invention relates to curtain airbag devices provided with curtain airbags that are capable of being deployed along inner side surfaces of vehicle cabins.

In a vehicle provided with a curtain airbag device, when the vehicle is involved in, for example, a side-on collision or rollover, curtain airbags are deployed downward along an inner side surface (for example, a door and a pillar) of the vehicle cabin so as to protect the head of the vehicle occupant and to keep the vehicle occupant inside the vehicle cabin.

U.S. Pat. No. 6,237,938 discloses a guide member provided on a C pillar for guiding downward (along the pillar) a rear portion of a curtain airbag, which is inflatable along tie inner side surface of the vehicle cabin. Moreover, the guide member in U.S. Pat. No. 6,237,938 (incorporated by reference herein) includes a track having a box-shaped cross-section and a slider (as referred to as an "element") that is movably arranged in the track in the longitudinal direction of the trick. The rear end portion of the curtain airbag is tied to the slider. To prevent the rear edge portion of the curtain airbag, which is moved downward, from being retracted upward, latches an arranged at regular intervals along substantially the entire length of the track. The top and bottom ends of the track are provided with mounting flanges; each of the flanges is fixed to the C pillar with a bolt or a screw.

Japanese Unexamined Patent Application Publication No. 2001-270413 (incorporated by reference herein) discloses another example of a curtain airbag device. In the curtain airbag device of Japanese Unexamined Patent Application Publication No. 2001-270413, the lower rear portion of a curtain airbag acts as a protruding portion that protrudes towards the back of the vehicle and that is not connected with the vehicle body such that the protruding portion is free with respect to the vehicle body. Further, the protruding portion is folded back along a folding line extending in the vertical direction. After folding the protruding portion, the curtain airbag is folded in a zigzag manner along folding lines extending in the horizontal direction.

Unfortunately, as a result of the structure provided in Japanese Unexamined Patent Application Publication No. 2001-270413, when the curtain airbag is inflated and deployed, the protruding portion is deployed towards the back of the vehicle, rather than backward and downward.

Accordingly, the present invention has been made in light of the aforementioned problems. It is an object of the present invention to provide a curtain airbag device having a curtain airbag the lower corner of which can be deployed smoothly and widely.

SUMMARY

According to an embodiment of the invention, a curtain airbag is provided. The curtain airbag, which is configured to be deployed downward along an inner side surface of a vehicle cabin, includes, among other possible things, a lower rear portion that is folded back at an angle with respect to a horizontal axis of the airbag along at least one slanted folding line. The curtain airbag is subsequently folded such that the folded curtain airbag extends in the longitudinal direction of a vehicle.

In a further embodiment of the curtain airbag, the at least one slanted folding line may become higher as the line extends towards the back of the vehicle.

In another further embodiment of the curtain airbag, the airbag may also include a guide member configured to be attached to a pillar of the vehicle. The guide member may extend in the vertical direction so as to guide the curtain airbag downward during a deployment process. The curtain airbag may include a link strap that protrudes from a lower portion of the curtain airbag and is guided by the guide member. According to such a structure, when the curtain airbag is being inflated downward, the link strap may move downward smoothly while being pulled by the curtain airbag.

In another former embodiment of the curtain airbag, a rear portion of the curtain airbag, after a deployment process, may be configured to cover an inner side surface of the pillar of the vehicle. The lower rear portion of the curtain airbag may be configured to be folded back at an angle towards the interior of the vehicle cabin along the at least one slanted folding line. The curtain airbag may be subsequently folded such that the folded curtain airbag is configured to extend in the longitudinal direction of the vehicle. Consequently, by folding back the lower rear portion of the curtain airbag towards the interior of the vehicle cabin along at least one slanted folding line, the rear portion of the curtain airbag maybe prevented from being caught on the pillar of the vehicle.

In another further embodiment of the curtain airbag, a front portion of the curtain airbag may be configured to be fixed to at least two sections of a pillar of the vehicle such that the front portion is disposed along a direction in which the second pillar extends. Specifically, the at least two sections may include a first section disposed closer towards a top end of the second pillar, and a second section disposed lower than the first section. A regular triangle having the line connecting the first and second sections as one of the sides of the regular triangle may be formed in the front portion of the curtain airbag. A region surrounded by the regular triangle may include a chamber that is configured to be inflamed by receiving gas from the gas generator.

According to such a structure, because the chamber may become inflated as the curtain airbag is deployed, the font portion of the curtain airbag may be tightly pulled between the first section closer towards the top end of the pillar and to second section closer than the down end of the pillar. This prevents, for example, a vehicle occupant from being thrown out of the vehicle through the window even when the vehicle occupant crashes into the curtain airbag. Accordingly, the second pillar can safely support the vehicle occupant so is to restrain the vehicle occupant.

In another further embodiment of the curtain airbag, the at least one slanted folding line may include two or more slanted folding lines. After the lower rear portion of curtain airbag is folded back two or more times along the slanted folding lines, the curtain airbag may be folded such that the folded curtain airbag extends in the longitudinal direction of the vehicle. Accordingly, this may increase the constant weight of the lower rear portion of the curtain bag and, therefore, allow the lower rear portion to pull its adjacent region with a greater force towards the back and downward at an angle at the final stage of the deployment of the curtain airbag. As a result, the curtain airbag can be deployed more rapidly and sufficiently towards the back and in the downward direction.

In another further embodiment of the curtain airbag, the two or more slanted folding lines may be at an angle of between about 10° and about 80° with respect to the horizontal axis of the curtain airbag. Further, the two or more slanted folding lines may be at an angle of between about 30° and about 60° with respect to the horizontal axis of the curtain airbag.

According to another embodiment of the invention, a curtain airbag device is provided. The curtain airbag includes, among other possible things: (a) a curtain airbag that is capable of being deployed downward along an inner side surface of a vehicle cabin; and (b) a gas generator for supplying gas to the curtain airbag so as to inflate the curtain airbag. A lower rear portion of the curtain airbag is folded back at an angle with respect to a horizontal axis of the airbag along at least one slanted folding line. The curtain airbag is subsequently folded such that the folded curtain airbag extends in the longitudinal direction of a vehicle.

In a further embodiment of the curtain airbag device, the at least one slanted folding line becomes higher as the line extends towards the back of the vehicle.

In another further embodiment of the curtain airbag device, the device may also include a guide member attached to a pillar of the vehicle. The guide member may extend in the vertical direction so as to guide the curtain airbag downward during a deployment process. Further, the curtain airbag may include a link strap that protrudes from a lower portion of the curtain airbag and is guided by the guide member.

In another further embodiment of the curtain airbag device, a rear portion of the curtain airbag, after a deployment process, may cover an inner side surface of the pillar of the vehicle. The lower rear portion of the curtain airbag may be folded back at an angle towards the interior of the vehicle cabin along the at least one slanted folding line. Further, the curtain airbag may be subsequently folded such that the folded curtain airbag extends in the longitudinal direction of the vehicle.

In another further embodiment of the curtain airbag device, a front portion of the curtain airbag may be fixed to at least two sections of a pillar of the vehicle such that the front portion is disposed along a direction in which the second pillar extends. Specifically, the at least two sections may include a first section disposed closer towards a top end of the second pillar, and a second section disposed lower than the first section. Moreover, a virtual eciuilateral triangle having the line connecting the first and second sections as one of the sides of the equilateral triangle may be formed in the front portion of the curtain airbag. A region surrounded by the eqiuilateral triangle may include a portion of a chamber that can be inflated by receiving gas from the gas generator.

In another further embodiment of the curtain airbag device, the at least one slanted folding line may include two or more slanted folding lines. After the lower rear portion of curtain airbag is folded back two or more times along the slanted folding lines, the curtain airbag may be folded such that the folded curtain airbag extends in the longitudinal direction of the vehicle.

In another further embodiment of the curtain airbag device, the two or more slanted folding lines may be at an angle of between about 10° and about 80° with respect to the horizontal axis of the curtain airbag. Further, the two or more slanted folding lines may be at an angle of between about 30° and about 60° with respect to the horizontal axis of the curtain airbag.

Another embodiment of the invention addresses a vehicle that includes, among other possible things: (a) a vehicle cabin that includes among other possible things, (i) at least one inner side surface; and (ii) a roof side; and (b) a curtain airbag positioned along a boundary between the inner side surface and the roof side, the curtain airbag including among other possible things a lower rear portion that is folded back at an angle with respect to a horizontal axis of the airbag along at least two slanted folding lines. The curtain airbag is subsequently folded such that the folded curtain airbag extends in the longitudinal direction of a vehicle. The curtain airbag is configured to be deployed downward along the inner side surface of the vehicle cabin.

In a further embodiment of this vehicle, the at least two slanted folding lines may be at an angle of between about 30° and about 60° with respect to the horizontal axis of the curtain airbag.

The curtain airbag is deployed downward when the gas generator is activated. When the gas reaches the lower rear portion of the curtain airbag, the lower rear portion becomes deployed toward the back of the vehicle and downward at an angle. Thus, the lower rear portion of the curtain airbag pulls its adjacent region towards the back and downward at an angle at the final stage of the deployment of the curtain airbag. Accordingly, the curtain airbag can be deployed rapidly and sufficiently towards the back and in the downward direction.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
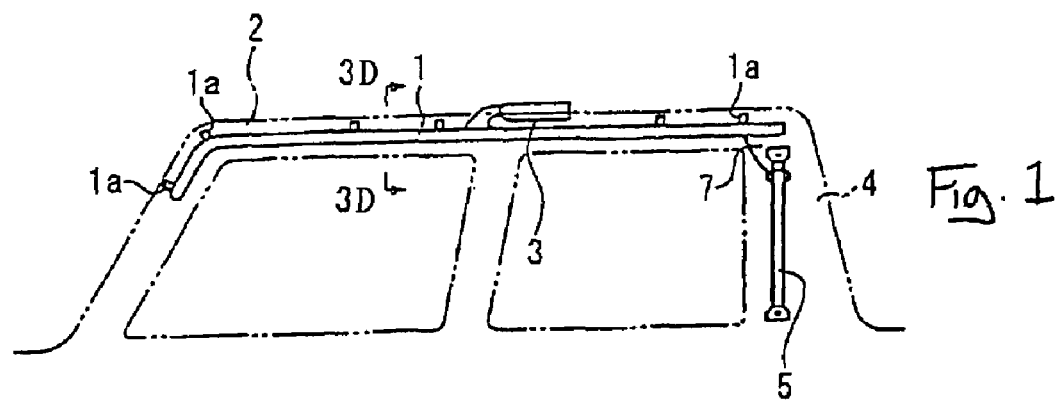
FIG. 1 is a schematic diagram of a curtain airbag device according to an embodiment of the present invention.

Embodiments of the present invention will be described hereinafter with reference to the drawings. As shown in FIG. 1, a curtain airbag 1 is disposed along a roof side 2 of a vehicle (border sections between the ceiling and inner side surfaces of a vehicle cabin) while being folded in a slender manner in the longitudinal direction of the vehicle. An upper edge of each curtain airbag 1 is provided with tabs 1a that are fixed to the corresponding roof side 2. The roof side 2 is provided with a roof-side garnish (not shown) that covers the corresponding curtain airbag 1.

When a vehicle is involved in, for example, a side-on collision or a rollover, each curtain airbag 1 is inflated as a result of gas being sent from an inflator (i.e., gas generator) 3. The curtain airbag 1 is deployed in the downward direction of the vehicle body along the corresponding side surface, i.e. doors and pillars, in the vehicle cabin.

Figure 2A:
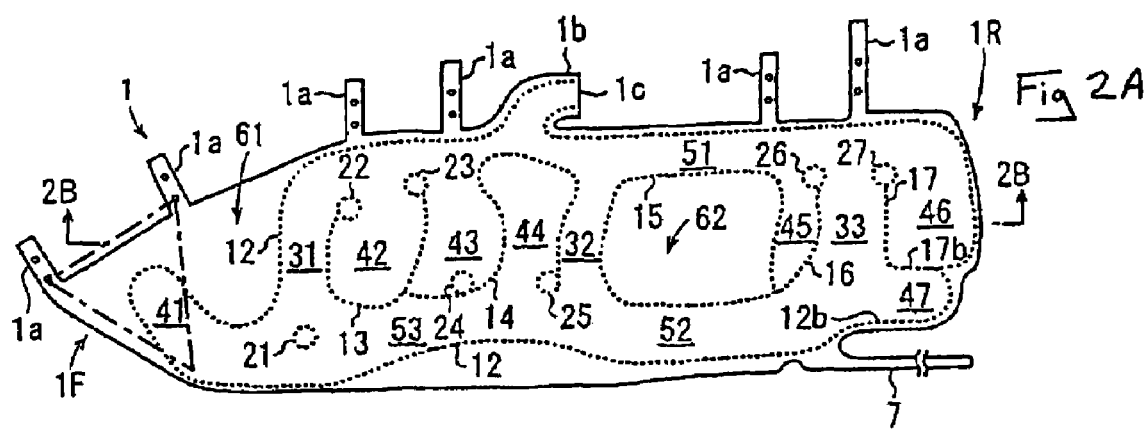
FIG. 2A is a side view of a curtain airbag in a deployed state.
Figure 2B:
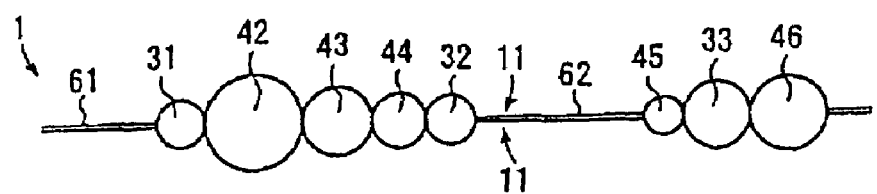
FIG. 2B is a cross-sectional view taken along line 2B-2B in FIG. 2A.

As shown in FIG. 2A, the central portion of the upper edge of each curtain airbag 1 with respect to the longitudinal direction is provided with a projection 1b that extends upward. The projection 1b is provided with a gas-entrance hole 1c. A tip of the inflator 3 is inserted through the gas-entrance hole 1e and is tied thereto with a band (not shown).

A pillar in a vehicle (e.g., a C pillar 4 in the shown embodiment) has a guide rod 5 attached thereto. The guide rod 5 functions as a guide element for guiding the rear portion of the corresponding curtain airbag 1 along the C pillar 4 when the curtain airbag 1 is deployed along the C pillar 4 in the downward direction of the vehicle body. The guide rod 5 has a rod-like structure that extends along the C pillar 4 in the vertical direction of the vehicle body. Both the upper and lower ends of the guide rod 5 are fixed to the C pillar 4 with, for example, bolts.

A link strap 7, which is positioned below a vertical chamber 33 of the curtain airbag 1, is a segment of two sheets 11, 11 forming the airbag 1. The link strap 7 extends in an elongated manner and protrudes from a bottom corner area in a rear portion of the curtain airbag 1. A front end of the link strap 7 is loosely tied around the guide rod 5. The link strap 7 is movable along the guide rod 5 in the vertical direction. Alternatively, the front end of the link strap 7 may be provided with a ring that is engaged with the guide rod 5.

As previously mentioned, the curtain airbag 1 is formed of two layers of sheets 11 having substantially the same shape. One of the sheets faces an inner side surface of the vehicle cabin and the other faces the interior of the vehicle cabin. The two sheets 11 are connected to each other via linear connected portions 12-17 (i.e., seams) and circular connected portions 21-27 so as to form vertical chambers 31-33, bag chamber 41-47, horizontal chambers 51-53, and non-inflatable portions 61, 62. Ends or a mid-section of each of the linear connected portions 13, 14, 16, and 17 are provided with the corresponding circular connected portions 22-27 for reinforcement.

The linear connected portions 12-17 and the circular connected portions 21-27 hermetically combine the sheets 11, 11 together. To connect the two sheets 11, 11, high-strength connecting means, e.g., stitching with high-strength threads, bonding with an adhesive having high adhesivity, welding, or other suitable means, may be used. As a result of the high-strength connecting means, the two sheets 11, 11 are prevented (or at least greatly inhibited) from separating from each other, even when the pressure inside the curtain airbag 1 reaches the upper limit pressure value.

The linear connected portion 12 extends substantially around the curtain airbag 1. However, at a front portion 1F of the curtain airbag 1, the line connected portion 12 extends downward from the upper edge of the front portion 1F so as to form a substantially U-shape. The U-shape of linear connected portion 12 forms the non-inflatable portion 61 along the upper edge of the front portion 1F and the bag chamber 41 at the frontmost part of the front portion 1F. In addition, the linear connected portion 12 extends along an edge of the projection 1b, but is cut off at the rear edge of the projection 1b so as to form the gas-entrance hole 1e of the curtain airbag 1.

The linear connected portion 13 is disposed slightly towards the front of the curtain airbag 1 with respect to the center of the curtain airbag 1. The linear connected portion 13 is U-shaped and its inner region forms the bag chamber 42. The upper portion of the bag chamber 42 communicates with the gas-entrance hole 1c, whereas the lower portion has no openings.

The linear connected portion 13 and the linear connected portion 12 at the front portion 1F of the curtain airbag 1 have the vertical chamber 31 disposed therebetween. The upper portion of the vertical chamber 31 communicates with the gas-entrance hole 1c, and the lower portion communicates with the bag chamber 41 and the horizontal chamber 53. To prevent the lower portion of the vertical chamber 31 from being over-inflated, a circular connected portion 21 is provided.

The linear connected portion 14 has a substantially S-shape and is disposed in a central portion of the curtain airbag 1 with respect to the longitudinal direction. The curved regions of the linear connected portion 14 respectively from the bag chambers 43 and 44. The upper portion of the bag chamber 43 communicates with the gas-entrance hole 1c, whereas the lower portion has no openings. On the other hand, the lower portion of the bag chamber 44 communicates with the horizontal chamber 53 and the lower portion of the vertical chamber 32, whereas the upper portion has no openings. The horizontal chamber 53 is disposed below the bag chambered 42, 43, and 44. The linear connected portion 14 and the linear connected portion 15, which will later be described, have the vertical chamber 32 disposed therebetween. The upper portion of the vertical chamber 32 communicates with the gas-entrance hole 1c.

The linear connected portion 15 is horizontally disposed slightly towards the back of the curtain airbag 1 with respect to the center of the curtain airbag 1. The linear connected portion 15 is substantially square-shaped. The upper side and the lower side of the linear connected portion 15 are respectively not in contact with the upper edge and the lower edge of the linear connected portion 12. Thus, the horizontal chamber 51 is formed between the upper edge of the linear connected portion 12 and the upper edge of the linear connected portion 15, and the horizontal chamber 52 is formed between the lower side of the linear connected portion 12 and the lower side of the linear connected portion 15. The inner region of the linear connected portion 15 is cut off from the gas-entrance hole 1c so as to form the non-inflatable portion 62.

The linear connected portion 15 and linear connected portion 16, which is disposed at the rear portion of the curtain airbag 1 and extends in the vertical direction, have the bag chamber 45 disposed therebetween. The upper portion of the bag chamber 45 communicates with the horizontal chamber 51.

The linear connected portion 16 and linear connected portion 17, which is substantially L-shaped and is disposed closer to a rear portion 1R of the curtain airbag 1, have the vertical chamber 33 disposed therebetween. The upper and lower portions of the vertical chamber 33 respectively communicate with the horizontal chambers 51 and 52.

A bag chamber 46 is formed between the linear connected portion 17 and a part of the linear connected portion 12 extending along the rear portion 1R of the curtain airbag 1. The upper portion of the bag chamber 46 communicates with the upper portion of the vertical chamber 33, whereas the lower portion of the bag chamber 46 has no openings.

A lower segment 17b of the linear connected portion 17 is connected with a lower-rear segment 12b of the linear connected portion 12. The lower segment 17b of the linear connected portion 17 and a lower-rear segment 12b of the linear connected portion 12 have the bag chamber 47 disposed therebetween. The front portion of the bag chamber 47 communicates with the lower portion of the vertical chamber 33, whereas the rear portion of the bag chamber 47 has no openings.

In this embodiment, the upper side of the front portion 1F of the curtain airbag 1 is fixed to two sections of an A pillar (not numerically labeled) via the tabs 1a. Specifically, the two sections are a first section closer towards the top end of the A pillar and a second section lower than the first section. Assuming that the first section closer towards the top end of the A pillar and the second section lower than the first section are connected in a line, a virtual equilateral triangle (drawn in phantom lines in FIG. 2A) having the line as one of the sides of the triangle is formed in the front portion 1F of the curtain airbag 1. A region enclosed by such an equilateral triangle has the bag chamber 41 disposed therein.

Figure 3A:
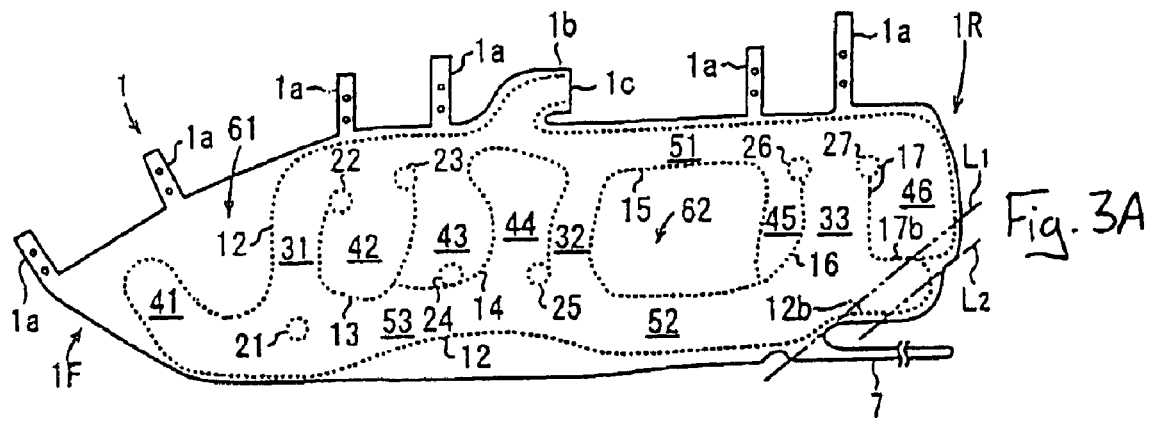
FIGS. 3A and 3B are schematic diagrams each illustrating the folding process for the curtain airbag.

With respect to FIG. 3A, to fold the curtain airbag 1, the lower rear edge of the curtain airbag 1 is folded back at an angle along slanted folding lines $L_1$ and $L_2$. The folding lines $L_1$ and $L_2$ become higher as they extend towards the back of the curtain airbag 1, and the angle of inclination for each of the folding lines $L_1$ and $L_2$ is preferably within a range of about 10° to about 80° with respect to the horizontal axis of the airbag 1, and more preferably within a range of about 30° to about 60° with respect to the horizontal axis of the airbag 1.

Figure 3B:
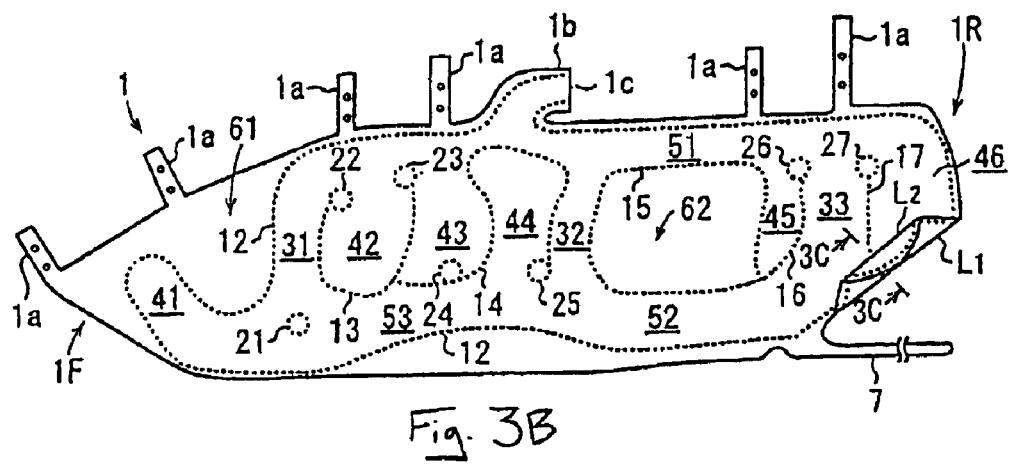
Figure 3C:
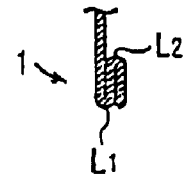
FIG. 3C is a cross-sectional view taken along line 3C-3C in FIG. 3B.

As shown in FIG. 3B, to fold the curtain airbag 1, the curtain airbag 1 may first be folded back along the folding line $L_1$ towards the interior of the vehicle cabin, and then be folded back along the folding line $L_2$ towards the interior of the vehicle cabin. As a result, the folding takes a zigzag folding pattern as shown in FIG. 3C.

Alternatively, the curtain airbag 1 may first be folded back along the folding line $L_2$, and then be folded back along the folding line $L_1$. Although two folding lines are more preferred, there may alternatively be only a single folding line, or three or more folding lines. Furthermore, the folding direction may be toward the interior wall of the vehicle rather than towards the interior of the vehicle cabin. As a further alternative, the lower rear portion may be folded into the curtain airbag 1.

Figure 3D:
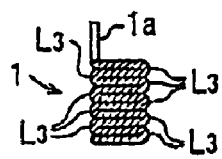
FIG. 3D is a cross-sectional view taken along line 3D-3D in FIG. 1.

As shown in FIG. 3D, after folding the lower rear portion of the curtain airbag 1 at an angle, the curtain airbag 1 is vertically folded in a zigzag manner along folding lines $L_3$ that extend in the longitudinal (i.e., horizontal) direction of the curtain airbag 1, i.e., the folding lines $L_3$ are substantially parallel to the upper edge of the curtain airbag 1.

When a vehicle provided with such a curtain airbag device is involved in a side-on collision or a rollover, the inflator 3 generates gas so as to start to inflate the curtain airbag 1. The curtain airbag 1 pushes and opens the roof-side garnish, passes over the upper end of the pillar garnish towards the interior of the vehicle cabin. The curtain airbag 1 is then deployed downward along the surface of the pillar garnish.

The rear portion of the deploying curtain airbag 1 is guided by the guide rod 5 via the link strap 7. The link strap 7 starts moving downward along the guide rod 5 when the curtain airbag 1 begins to deploy. In this case, the link strap 7 moves downward while ripping through the pillar garnish and a weather strip. Furthermore, the link strap 7 moves downward along the guide rod 5 until the curtain airbag 1 reaches the bottommost point of deployment. As the curtain airbag 1 is guided by the guide rod 5 via the link strap 7, the curtain airbag 1 can be deployed along the side surface of the vehicle cabin.

According to this embodiment, when the curtain airbag 1 is deployed downward and the gas reaches the lower rear portion, the lower rear portion, which was folded back along the folding lines $L_1$ and $L_2$, deploys in a direction perpendicular to the folding lines $L_1$ and $L_2$ (that is, towards the back of the curtain airbag 1 and downward at an angle). Thus, the adjacent region of the lower rear portion is pulled back and downward, causing the lower rear region of the curtain airbag 1 to be quickly inflated toward the back and in the downward direction. Moreover, if the adjacent region of the lower rear portion of the curtain airbag 1 begins to shrink as the curtain airbag 1 is inflated, a pulling force is applied to the adjacent region from the lower rear portion of the curtain airbag 1, thereby overcoming the shrinking force. Thus, the lower rear region of the curtain airbag 1 can be fully deployed downward and towards the back of the curtain airbag 1.

As previously described, the upper edge of the front portion 1F of the curtain airbag 1 is fixed to the two sections of the A pillar, i.e. the first section closer towards the top end of the A pillar and the second section lower than the first section, via the tabs 1a. Moreover, the front portion 1F of the curtain airbag 1 defines the equilateral triangle region that includes the line connecting the first and second section as one of the sides of the triangle, such that the bag chamber 41 is inflated within this triangular region. Consequently, the front portion 1F, of the curtain airbag 1 becomes strained as the bag chamber 41 is inflated, allowing the front portion 1F to be, tightly pulled between the first section closer towards the top end of the A pillar and the second section lower than the first section. This prevents, for example, a vehicle occupant from being thrown out of the vehicle through the window even when the vehicle occupant crashes into the curtain airbag 1. Accordingly, the A pillar can safely support the vehicle occupant so as to restrain the vehicle occupant.

Although not shown in the drawings, according to the present invention, the curtain airbag 1 may have an alternative structure in which the rear portion 1R of the curtain airbag 1, after the deployment process, covers the surface of the C pillar 4 facing the interior of the vehicle cabin. Such a structure may prevent the vehicle occupant from crashing into, for example, the C pillar 4 or the guide rod 5. In that case, it may be preferable to fold the lower rear region of the curtain airbag 1 back towards the interior of the vehicle cabin along the slanted folding lines $L_1$ and $L_2$. By folding the lower rear portion of the curtain airbag 1 towards the interior of the vehicle cabin along the slanted folding lines $L_1$ and $L_2$, the rear portion 1R of the curtain airbag 1 can be prevented from being caught on the C pillar 4 when the curtain airbag 1 is deployed.

After the lower rear portion of the curtain airbag is folded back along slanted folding lines two or more times, the curtain airbag may be folded in a slender manner in the longitudinal direction of the vehicle. This increases the constant weight of the lower rear portion of the curtain airbag and, therefore, allows the lower rear portion to pull its adjacent region with a greater force towards the back and downward at an angle during the final stage of the deployment of the curtain airbag. Accordingly, the curtain airbag can be deployed more rapidly and sufficiently towards the back and in the downward direction.

The priority application, Japanese Application 2003-427238, which was filed Dec. 24, 2003, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. For example, the number and positions of the vertical chambers and the bag chambers are not limited to those in the drawings. By way of further example, although the curtain airbag 1 is folded in a zigzag manner along folding lines $L_3$ extending in the longitudinal direction of the curtain airbag 1 after the lower rear portion of the curtain airbag 1 is folded back along the slanted folding lines $L_1$ and $L_2$, the curtain airbag 1 may alternatively be rolled after the angled folding along lines $L_1$ and $L_2$. The scope of the present invention is to be defined as set forth in the following claims.

What is claimed is:

1. A curtain airbag that is configured to be deployed downward along an inner side surface of a vehicle cabin, the curtain airbag comprising:
   a lower rear portion that is folded back at an angle with respect to a horizontal axis of the airbag, along at least two slanted non-intersecting folding lines,
   wherein the curtain airbag is subsequently folded such that the folded curtain airbag extends in the longitudinal direction of a vehicle.

2. The curtain airbag according to claim 1, wherein each slanted folding line becomes higher as the line extends towards the back of the vehicle.

3. The curtain airbag according to claim 1,
   wherein the curtain airbag comprises a link strap that protrudes from a lower portion of the curtain airbag and is configured to be guided by a guide member attached to a pillar of the vehicle such that the curtain airbag is guided downward during a deployment process.

4. The curtain airbag according to claim 1, wherein a rear portion of the curtain airbag, after a deployment process, is configured to cover an inner side surface of a pillar of the vehicle, wherein the lower rear portion of the curtain airbag is configured to be folded back at an angle towards the interior of the vehicle cabin along each of the at least two slanted non-intersecting folding lines, and wherein the curtain airbag is subsequently folded such that the folded curtain airbag is configured to extend in the longitudinal direction of the vehicle.

5. The curtain airbag according to claim 1, wherein a front portion of the curtain airbag is configured to be fixed to at least two sections of a pillar of the vehicle such that the front portion is disposed along a direction in which the pillar extends, wherein the at least two sections comprise a first section disposed closer towards a top end of the pillar, and a second section disposed lower than the first section, wherein a virtual equilateral triangle having a line connecting the first and second sections as one of the sides of the equilateral triangle is formed in the front portion of the curtain airbag, and wherein a region surrounded by the equilateral triangle comprises a portion of a chamber that is configured to be inflated by receiving gas from a gas generator.

6. The curtain airbag according to claim 1, wherein the at least two slanted non-intersecting folding lines comprises two or more slanted folding lines.

7. The curtain airbag according to claim 6, wherein, after the lower rear portion of curtain airbag is folded back two or more times along the slanted folding lines, the curtain airbag is folded such that the folded curtain airbag extends in the longitudinal direction of the vehicle.

8. The curtain airbag according to claim 6, wherein the two or more slanted folding lines are at an angle of between about 10° and about 80° with respect to the horizontal axis of the curtain airbag.

9. The curtain airbag according to claim 6, wherein the two or more slanted folding lines are at an angle of between about 30° and about 60° with respect to the horizontal axis of the curtain airbag.

10. A curtain airbag device comprising:
    a curtain airbag that is capable of being deployed downward along an inner side surface of a vehicle cabin; and
    a gas generator for supplying gas to the curtain airbag so as to inflate the curtain airbag,
    wherein a lower rear portion of the curtain airbag is folded back at an angle with respect to a horizontal axis of the airbag along at least two slanted non-intersecting folding lines, and wherein the curtain airbag is subsequently folded such that the folded curtain airbag extends in the longitudinal direction of a vehicle.

11. The curtain airbag device according to claim 10, wherein each of the at least two slanted non-intersecting folding lines becomes higher as the line extends towards the back of the vehicle.

12. The curtain airbag device according to claim 10, further comprising:
    a guide member attached to a pillar of the vehicle,
    wherein the guide member extends in the vertical direction so as to guide the curtain airbag downward during a deployment process, and wherein the curtain airbag comprises a link strap that protrudes from a lower portion of the curtain airbag and is guided by the guide member.

13. The curtain airbag device according to claim 10, wherein a rear portion of the curtain airbag, after a deployment process, covers an inner side surface of a pillar of the vehicle, wherein the lower rear portion of the curtain airbag is folded back at an angle towards the interior of the vehicle cabin along the at least two slanted non-intersecting folding lines, and wherein the curtain airbag is subsequently folded such that the folded curtain airbag extends in the longitudinal direction of the vehicle.

14. The curtain airbag device according to claim 10, wherein a front portion of the curtain airbag is fixed to at least two sections of a pillar of the vehicle such that the front portion is disposed along a direction in which the pillar extends, wherein the at least two sections comprise a first section disposed closer towards a top end of the pillar, and a second section disposed lower than the first section, wherein a virtual equilateral triangle having a line connecting the first and second sections as one of the sides of the equilateral triangle is formed in the front portion of the curtain airbag, and wherein a region surrounded by the equilateral triangle comprises a portion of a chamber that can be inflated by receiving gas from the gas generator.

15. The curtain airbag device according to claim 10, wherein the at least two slanted non-intersecting folding lines comprises two or more slanted folding lines.

16. The curtain airbag device according to claim 15, wherein, after the lower rear portion of curtain airbag is folded back two or more times along the slanted folding lines, the curtain airbag is folded such that the folded curtain airbag extends in the longitudinal direction of the vehicle.

17. The curtain airbag device according to claim 15, wherein the two or more slanted folding lines are at an angle of between about 10° and about 80° with respect to the horizontal axis of the curtain airbag.

18. The curtain airbag device according to claim 15, wherein the two or more slanted folding lines are at an angle of between about 30° and about 60° with respect to the horizontal axis of the curtain airbag.

19. A vehicle comprising:
a vehicle cabin comprising:
- at least one inner side surface;
- a roof side; and
- a curtain airbag positioned along a boundary between the inner side surface and the roof side, the curtain airbag comprising:
  - a lower rear portion that is folded back at an angle with respect to a horizontal axis of the airbag along at least two slanted non-intersecting folding lines, wherein the curtain airbag is subsequently folded such that the folded curtain airbag extends in the longitudinal direction of the vehicle, and wherein the curtain airbag is configured to be deployed downward along the inner side surface of the vehicle cabin.

20. The vehicle according to claim 19, wherein the at least two slanted folding lines are at an angle of between about 30° and about 60° with respect to the horizontal axis of the curtain airbag.

* * * * *